March 14, 1961  J. M. BELANGER  2,974,933
GARDEN HOSE GUARD
Filed Feb. 24, 1959
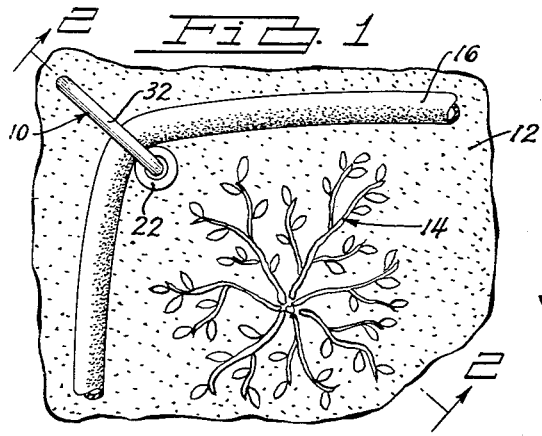
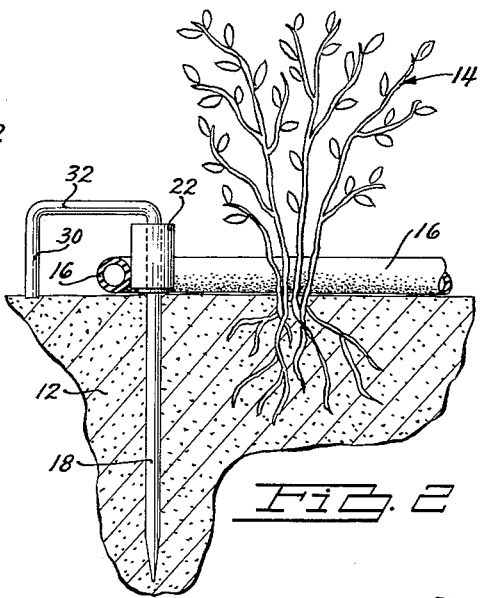
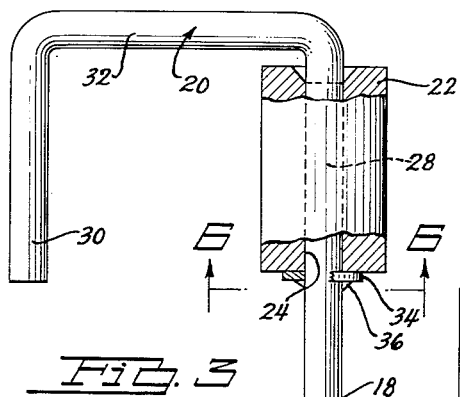
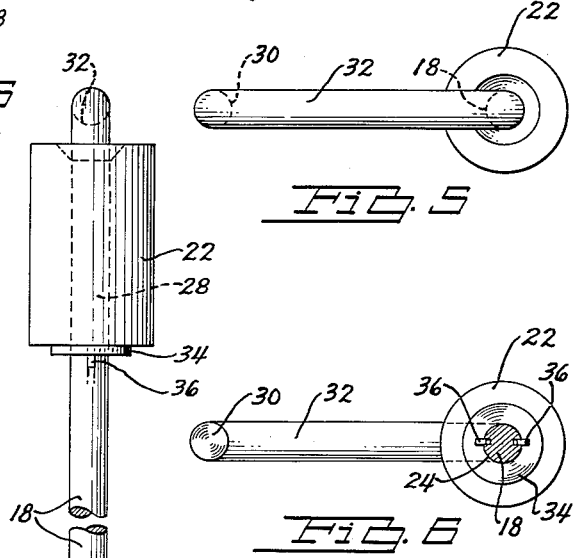
INVENTOR.
JEAN M. BELANGER
BY
ATTORNEYS 2,974,933

GARDEN HOSE GUARD

Jean M. Belanger, 3891 Bishop, Detroit, Mich.

Filed Feb. 24, 1959, Ser. No. 795,239

1 Claim. (Cl. 254—190)

My invention relates generally to garden accessories and, more particularly, to a hose guide for controlling the direction of the line of movement of a flexible hose. My invention finds particular utility as a garden appliance for use with a garden hose made of rubberized fabric or plastic for guiding the hose around corners of buildings or the like or around shrubbery.

The provision of a hose guide of the type above described being a principal object of my invention, it is a further object of my invention to provide a commercially acceptable hose guide capable of guiding a flexible hose when the same is drawn along the ground so that snarling or fouling will be avoided.

It is a further object of my invention to provide a hose guide as the type above set forth which will protect the hose from abrasion or creasing when the same is tensioned as it is drawn along the ground.

It is a further object of my invention to provide a hose guide for use as a garden accessory and which is capable of protecting shrubbery and other plants from damage when the hose is trained around the same.

It is a further object of my invention to provide a hose guide of the type above set forth and which is characterized by its simplified construction and wherein a minimum number of movable parts are employed.

It is a further object of my invention to provide a hose guide of type above set forth and which may be anchored in place and removed by a simple manual operation.

For the purpose of particularly describing a preferred embodiment of my invention reference will be made to the accompanying drawing wherein:

Fig. 1 shows a plan view of my improved hose guide as it would be installed when in use;

Fig. 2 is a side elevation view of my improved hose guide together with a cross sectional illustration of the ground in which it is anchored. The plane from which Fig. 2 is viewed is designated by section line 2—2 of Fig. 1;

Fig. 3 is an enlarged side elevation view of the hose guide shown in Figs. 1 and 2;

Fig. 4 is an end view of the hose guide of Fig. 3;

Fig. 5 is a top view of the hose guide of Fig. 3;

Fig. 6 is a cross sectional view taken along section line 6—6 of Fig. 3.

Referring first to Fig. 1 my improved hose guide is generally designated by numeral 10 and it is adapted to be anchored to a piece of ground shown at 12. Numeral 14 generally designates a piece of shrubbery or other garden plant, and numeral 16 designates a garden hose of the type used for watering shrubbery or plants.

The source of water supply in both residential and commercial gardens is normally located at two or three convenient locations. It is therefore necessary when using a garden hose to direct the same in a rather circuitous fashion around the garden when watering, in order to avoid damage to the planting. The hose guide of my instant invention makes it possible to train a garden hose along a desired path, such as the footpaths normally provided in garden areas.

In a similar fashion my improved hose guide can be placed adjacent to the fixed structures in the garden area to facilitate training of the hose around the same without causing damage to the hose.

Referring next to Figs. 2 and 3, my improved hose guide comprises an elongated shank portion 18 and an upper portion 20 in the form of a semi-closed rectangle. The shank portion 18 may be integrally formed with the upper portion 20, and the shank and upper portions may be formed from a common piece of stock, such as a steel rod of circular cross section. By preference, I employ cold rolled steel rods for this purpose since it is relatively inexpensive and since it is readily available. The upper portion 20 of the hose guide can be formed in the rectangular shape shown by a simple bending operation, since cold rolled steel stock is sufficiently malleable to make such a bending operation feasible.

I have provided a roller, as illustrated in the drawings, and have designated the same by numeral 22. This roller is cylindrical in form and it is formed with a centrally axially extending opening 24 through which the upper guide portion 20 is received. The opening 24 is formed with a desired degree of oversize to permit free rotation of the same on the upper guide portion 20. The axial length of roller 22 is slightly less than the length of one leg 28 of the upper guide portion 20. The other leg 30 of the upper guide portion 20 is substantially equal and parallel to the length of leg 28. The legs 28 and 30 are bridged by a transverse member 32 of the upper guide portion 20. A washer 34 is situated at the lower end of roller 22 and suitable abutments 36 may be provided, as shown, for positioning washer 34, thereby providing a seat for rollers 22. By preference, the abutments 36 are formed by hammering or otherwise upsetting the steel stock of which shank 18 is formed. By preference, the roller 22 is formed of wood, although I contemplate that plastic or other material may also be employed for this purpose.

In operation, the gardener may readily remove shank 18 from the ground whenever a change in location is desired. The leg 30 and the transverse member 32 form an adequate retaining means for maintaining the hose in proper operating relationship with respect to roller 22. When the hose guide is placed in position, the shank 18 may be inserted in the ground, as shown in Fig. 2, until the base of leg 30 and the base of roller 22 are substantially even with the surface of the ground. The garden hose is positioned within the enclosure provided by legs 28 and 30 and the transverse member 32.

When it is desired to remove the hose guide the upper portion 20 serves as a handle which may be gripped by the gardener to facilitate pulling. When used on grass lawns, it would be desirable to remove the hose guide in this fashion prior to trimming the grass.

Although my improved hose guide is particularly adapted for use in gardens and other planted areas, I contemplate that it may also be used for guiding cables and ropes around sharp corners or other obstacles, thereby avoiding damage to the rope or cable.

What I claim and desire to secure by U.S. Letters Patent is:

A guide for controlling the direction of the line of movement along the ground of a flexible elongated member comprising a shank adapted to be inserted in the ground, an inverted U-shaped upper guide portion having a pair of spaced parallel legs and an integral cross member, one of said legs being integral with and forming a continuation of said shank, said legs being substantially equal in length, a cylindrical roller journalled on said one leg, and means for retaining said roller in position and for preventing axial movement of the same along said shank, said U-shaped upper portion being adapted to straddle said flexible member thereby permitting the latter to ride on said roller when the same is dragged along the ground, said cross members being disposed above said flexible member when the latter is trained between said legs.

References Cited in the file of this patent

UNITED STATES PATENTS

| | | |
|---|---|---|
| 1,831,306 | Kakimoto | Nov. 10, 1931 |
| 2,501,407 | Olsen et al. | Mar. 21, 1950 |
| 2,618,465 | Austin | Nov. 18, 1952 |
| 2,846,189 | MacLaughlin | Aug. 5, 1958 |